March 5, 1940.    F. W. BURCH    2,192,396
STAIR CLIMBING HAND TRUCK
Filed July 12, 1938    2 Sheets-Sheet 1
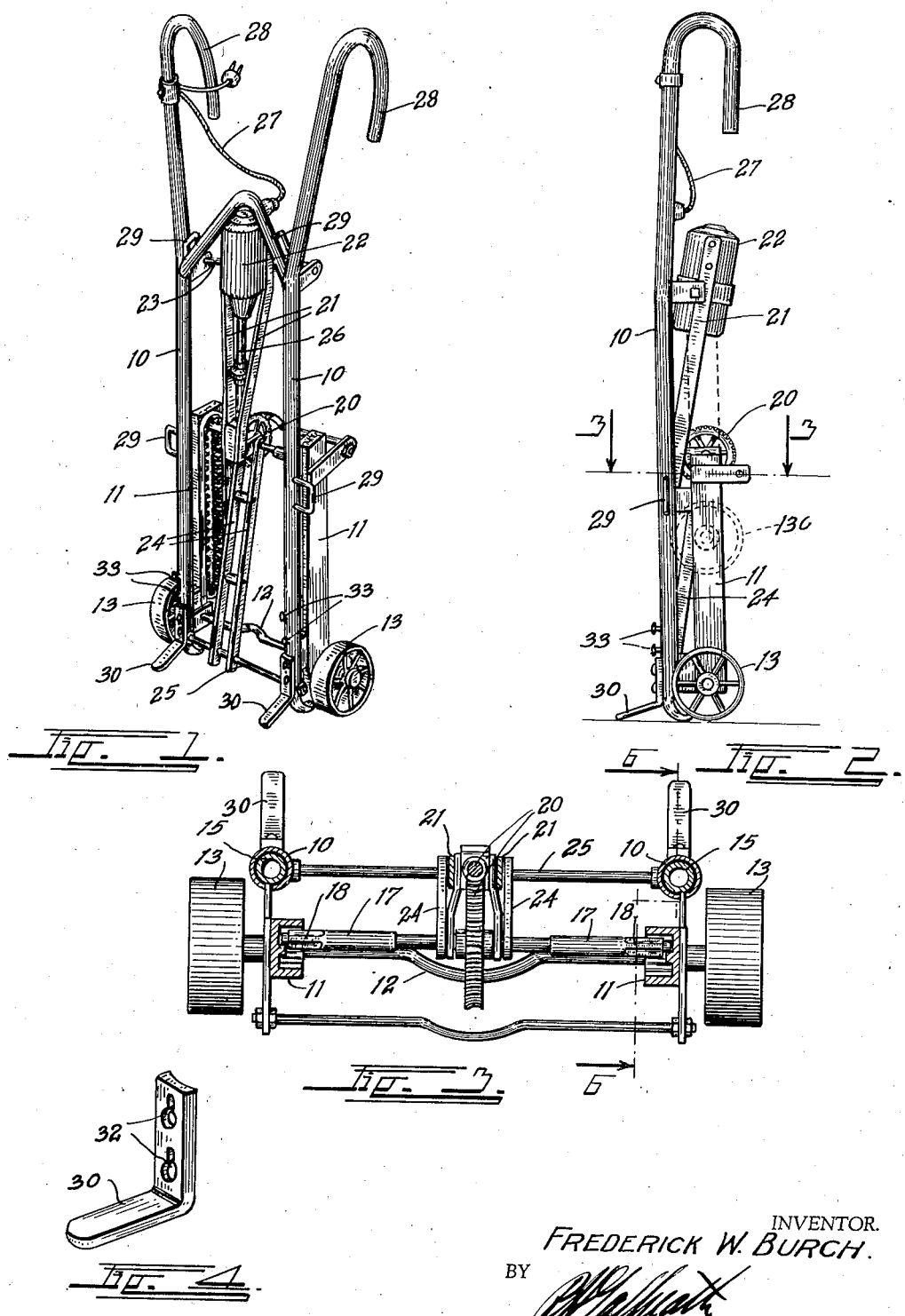
INVENTOR.
FREDERICK W. BURCH.
BY
ATTORNEY.

March 5, 1940.　　　F. W. BURCH　　　2,192,396
STAIR CLIMBING HAND TRUCK
Filed July 12, 1938　　　2 Sheets-Sheet 2
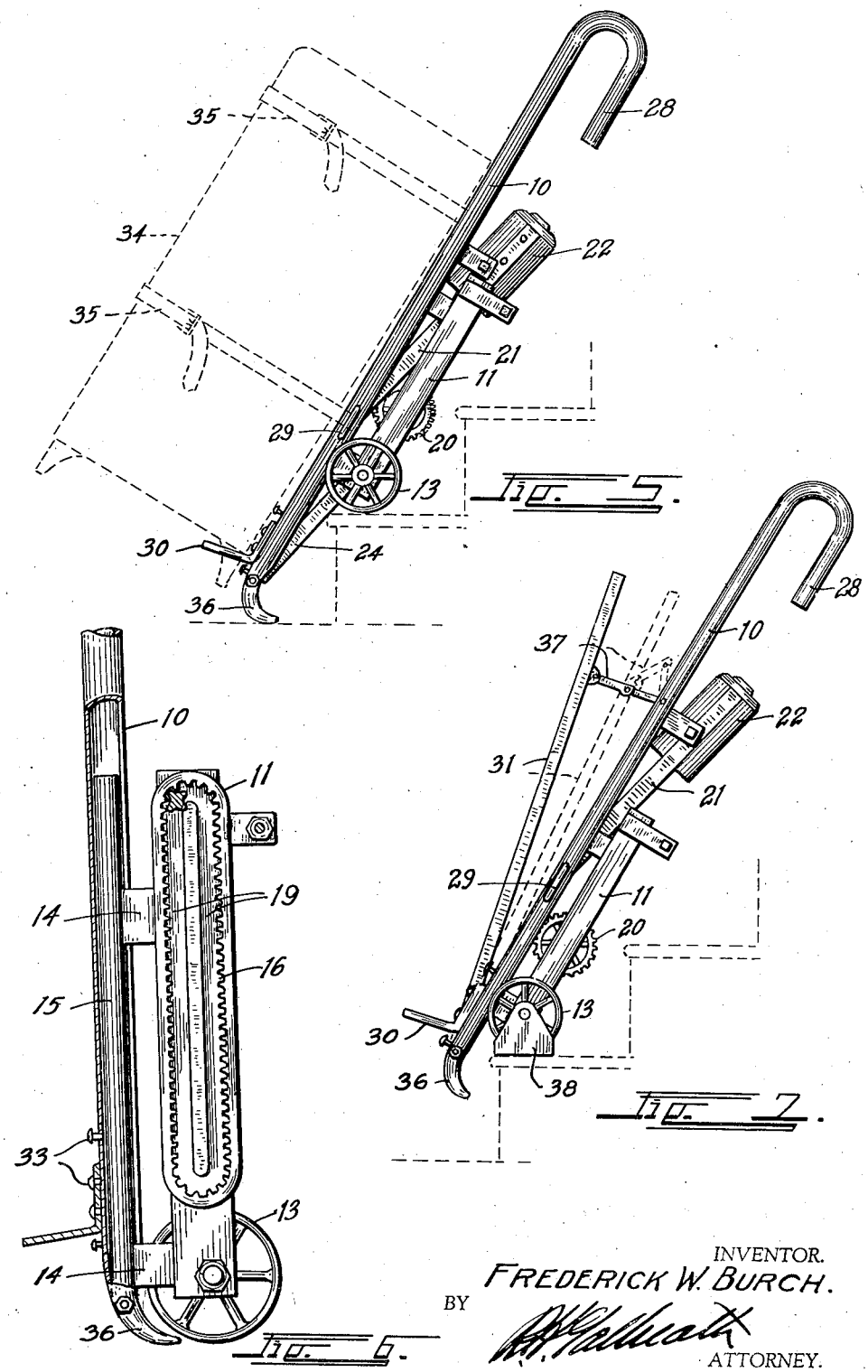
INVENTOR.
FREDERICK W. BURCH.
BY
ATTORNEY.

Patented Mar. 5, 1940

2,192,396

UNITED STATES PATENT OFFICE 2,192,396

STAIR CLIMBING HAND TRUCK

Frederick W. Burch, Pueblo, Colo.

Application July 12, 1938, Serial No. 218,744

8 Claims. (Cl. 280—29)

This invention relates to an improvement in hand trucks of the type usually used for transporting heavy articles by hand. The truck is more particularly used for handling household appliances such as refrigerators, stoves, radios, musical instruments, etc.

The principal object of the invention is to provide a truck of this character which can be electrically operated to elevate or lower an article step by step on a stairway so that articles weighing hundreds of pounds can be taken up and down stairs by a single operator.

Other objects of the invention are: to provide adjustable steps upon a hand truck so that they may be adjusted to accommodate any desired article; to provide means for tilting the article forwardly on the truck so as to shift the center of gravity forwardly over the wheels; and to provide means whereby articles may be securely tied to the truck.

Other objects and advantages reside in the detail construction of the invention, which is designed for simplicity, economy, and efficiency. These will become more apparent from the following description.

In the following detailed description of the invention, reference is had to the accompanying drawings which form a part thereof. Like numerals refer to like parts in all views of the drawings and throughout the description.

In the drawings:

Fig. 1 is a perspective view of the improved stair climbing truck.

Fig. 2 is a side view thereof.

Fig. 3 is a horizontal section looking downwardly on the line 3—3, Fig. 2.

Fig. 4 is a detail view of the adjustable step.

Fig. 5 is a side elevation of the complete truck in position upon the stairway.

Fig. 6 is an enlarged vertical section taken on the line 6—6, Fig. 3.

Fig. 7 is a side elevation of an alternate form of the truck in position on a stairway.

The invention comprises a main frame 10, preferably formed of metal tubing. A reciprocating frame 11 is slidably mounted on the main frame 10 and carries an axle 12 upon which truck wheels 13 are mounted. The main frame is formed with downwardly extending handles 28 and with strap loops 29 by means of which a refrigerator or similar article may be strapped to the truck. The lower extremities of the frame 10 are formed with rearwardly turned feet 36. The reciprocating frame is carried upon arms 14 which extend from slide bars or tubes 15 within the vertical members of the frame 10. The latter members are slotted for the passage of the arms 14. This construction allows the frame 11 to move upwardly and downwardly on the main frame 10. The movement of the frame 11 is accomplished by placing an elongated internal rack gear 16 at each side of the frame 11. A floating gear shaft 17 is carried from the main frame 10 and terminates in external gear teeth 18 which mesh with the teeth of the gears 16. The extremities of the shaft 17 travel in an oval guide track 19 which holds the gears 18 constantly in mesh with the gears 16.

The shaft 17 is driven through the medium of a worm gear transmission unit 20, which is supported upon a motor frame 21 extending from the motor 22. The motor 22 is carried on a tilting hinge shaft 23 which allows it to freely oscillate as the shaft 17 travels around the guide track 19. The motor shaft, indicated at 26, transmits power to the worm gear transmission unit 20. The gear shaft 17 is tied to the gear shaft 16 by means of an oscillating brace frame 24 which extends to a cross bar 25 in the main frame. A suitable electric cord 27 is provided for carrying current to the motor.

It can be readily seen that if the motor is caused to operate it will cause the gears 18 to alternately climb one side of the gears 16 and then descend on the opposite side thereof, thus continuously reciprocating the frame 11 on the frame 10 and alternately lifting and lowering the wheels 13. The articles to be transported are supported on the frame by means of feet 30 the height of which is adjustable. The feet consist of L shaped members, the vertical legs of which contain elongated locking openings 32 which can be slipped over any desired pair of projecting headed lugs 33 on the frame 10. This construction enables the operator to place the feet at any point to effectively lift the particular article being transported.

Let us assume that a heavy article such as a refrigerator, indicated in broken line at 34, is to be elevated up a stairway by means of this truck. The refrigerator is strapped to the strap loops of the frame by suitable straps, such as indicated at 35. The operator backs the truck to a position below the lowermost step of the stairs and starts the motor 22. This causes the wheels to rise above the first step and then descend thereon, as shown in Fig. 4. Since the wheels cannot move further downward, the truck and its load is now lifted until the lower extremity of the frame 10 is above the first step.

The frame is now tilted forwardly until the feet 36 rest upon the first step. The wheels now ascend to the second step and descend upon the latter where they act to again lift the frame 10 until the feet 36 can be rested on the second step. Thus the wheels successively rest on each step and lift the frame to each successive step throughout the length of the stairway.

To lower an article it is wheeled to the topmost step and the motor is started. The gears 18 start to descend along the gears 16 and the frame 10 lowers until its lower extremity rests upon the next to the topmost step. The operator then tilts the truck forwardly allowing the wheels to lower to the latter step. On reaching the latter step, the wheels lift the frame slightly so that its lower extremity may be tilted forwardly to pass the step on the next downward movement of the wheels.

It has been found that when handling exceedingly heavy articles it is an advantage to provide means for shifting the center of gravity forward to facilitate tilting of the truck during the climbing operation. This may be accomplished by providing a hinged frame 31 on the forward face of the main frame 10. This frame is hinged on the cross bar 25 at its bottom and can be held away from the upper portion of the frame 10 by means of a pair of folding brace arms 37. In this form of the invention the refrigerator or other article to be lifted would be strapped to the hinged frame 31.

For use on stairways where the steps are not level it is desirable to employ a swinging base member such as shown at 38 in Fig. 7. This base member is swingingly suspended from the axle 12 and, when the wheels are lifted will swing downwardly to form a substantial, non-slipping tread while climbing the stairs. As soon as the truck is pushed it will tilt off of the base member onto its wheels.

The basic principle of the invention resides in providing means on a hand truck for raising and lowering the wheels thereof a distance at least equal to the average stair step.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A stair climbing hand truck comprising: a main frame; means on said main frame for supporting an article; a second frame; means for slidably mounting said second frame on said main frame so that it may reciprocate longitudinally thereof; wheels carried by said second frame; an elongated internal gear positioned at each side of said second frame; a gear shaft supported from said main frame; gear pinions on said gear shaft in mesh with said elongated internal gears; and means for rotating said gear shaft to cause said internal gears to travel thereabout to reciprocate said second frame on said main frame.

2. A stair climbing hand truck comprising: a main frame; means on said main frame for supporting an article; a second frame; means for slidably mounting said second frame on said main frame so that it may reciprocate longitudinally thereof; wheels carried by said second frame; an elongated internal gear positioned at each side of said second frame; a gear shaft supported from said main frame; gear pinions on said gear shaft in mesh with said elongated internal gears; a motor mounted upon said main frame; and power transmission means for transmitting the power of said motor to rotate said gear shaft to cause the latter to reciprocate said second frame on said main frame.

3. A stair climbing hand truck comprising: a main frame; means on said main frame for supporting an article; a second frame; means for slidably mounting said second frame on said main frame so that it may reciprocate longitudinally thereof; wheels carried by said second frame; an elongated internal gear positioned at each side of said second frame; a gear shaft supported from said main frame; gear pinions on said gear shaft in mesh with said elongated internal gears; means for rotating said gear shaft to cause said internal gears to travel thereabout to reciprocate said second frame on said main frame; and swinging means for supporting said motor and said gear shaft so that the latter may follow the contour of said internal gears.

4. A stair climbing hand truck comprising: a main frame; a second frame; means for slidably mounting said second frame on said main frame so that it may reciprocate longitudinally thereof; and wheels carried by said second frame, the lower extremities of said main frame being turned rearwardly toward and terminating near the said wheels to engage a supporting surface adjacent the point of ground engagement of said wheels, only when said main frame is tilted to a vertical position or when the said second frame is reciprocated on said main frame.

5. A stair climbing hand truck comprising: a main frame; a second frame; means for slidably mounting said second frame on said main frame so that it may reciprocate thereon; wheels carried by said second frame; an elongated internal gear positioned at each side of said second frame; a gear shaft supported from said main frame; gear pinions on said gear shaft; a guide track in said second frame to hold said gear pinions in mesh with said elongated internal gears; and means for rotating said gear shaft to cause said internal gears to travel in said guide track to reciprocate said second frame on said main frame.

6. A stair climbing hand truck comprising: a main frame; a second frame; means for slidably mounting said second frame on said main frame so that it may reciprocate thereon; wheels carried by said second frame; an elongated internal gear positioned at each side of said second frame; a gear shaft supported from said main frame; gear pinions on said gear shaft; in mesh with said elongated internal gears; a motor mounted on said main frame; power transmission means for rotating said gear shaft to cause said internal gears to travel thereabout to reciprocate said second frame on said main frame; a tilting hinge shaft mounted on said main frame; and means for supporting said motor and said gear shaft on said tilting hinge shaft so that the gear shaft may follow the contour of said internal gears.

7. A stair climbing hand truck comprising: a main frame; a second frame; means for slidably mounting said second frame on said main frame so that it may reciprocate thereon; wheels carried by said second frame; an elongated internal gear positioned at each side of said second frame; a gear shaft; gear pinions on said gear shaft; a cross bar on said main frame; an oscillating brace frame extending from said cross bar to said gear shaft to support the latter; and means for rotating said gear shaft to cause said second frame to reciprocate on said main frame.

8. A stair climbing hand truck comprising: a main frame; means on said main frame for supporting an article; a second frame; slide bars mounted in said main frame; arms extending from said slide bars to said second frame to support the latter so that it may reciprocate on the said main frame; wheels carried by said second frame; an elongated internal gear positioned at each side of said second frame; a gear shaft; gear pinions on said gear shaft; a guide track in said second frame to hold said gear pinions in mesh with said elongated internal gears; a cross bar on said main frame; an oscillating brace frame extending from said cross bar to said gear shaft to support the latter; a motor mounted on said main frame; power transmission means for transmitting the power of said motor to rotate said gear shaft to cause said internal gears to travel in said guide track to reciprocate said second frame on said main frame; a tilting hinge shaft mounted on said main frame; and means for supporting said motor on said tilting hinge shaft.

FREDERICK W. BURCH.